March 7, 1944. S. C. CARNEY 2,343,401
SEPARATION APPARATUS
Original Filed June 26, 1939
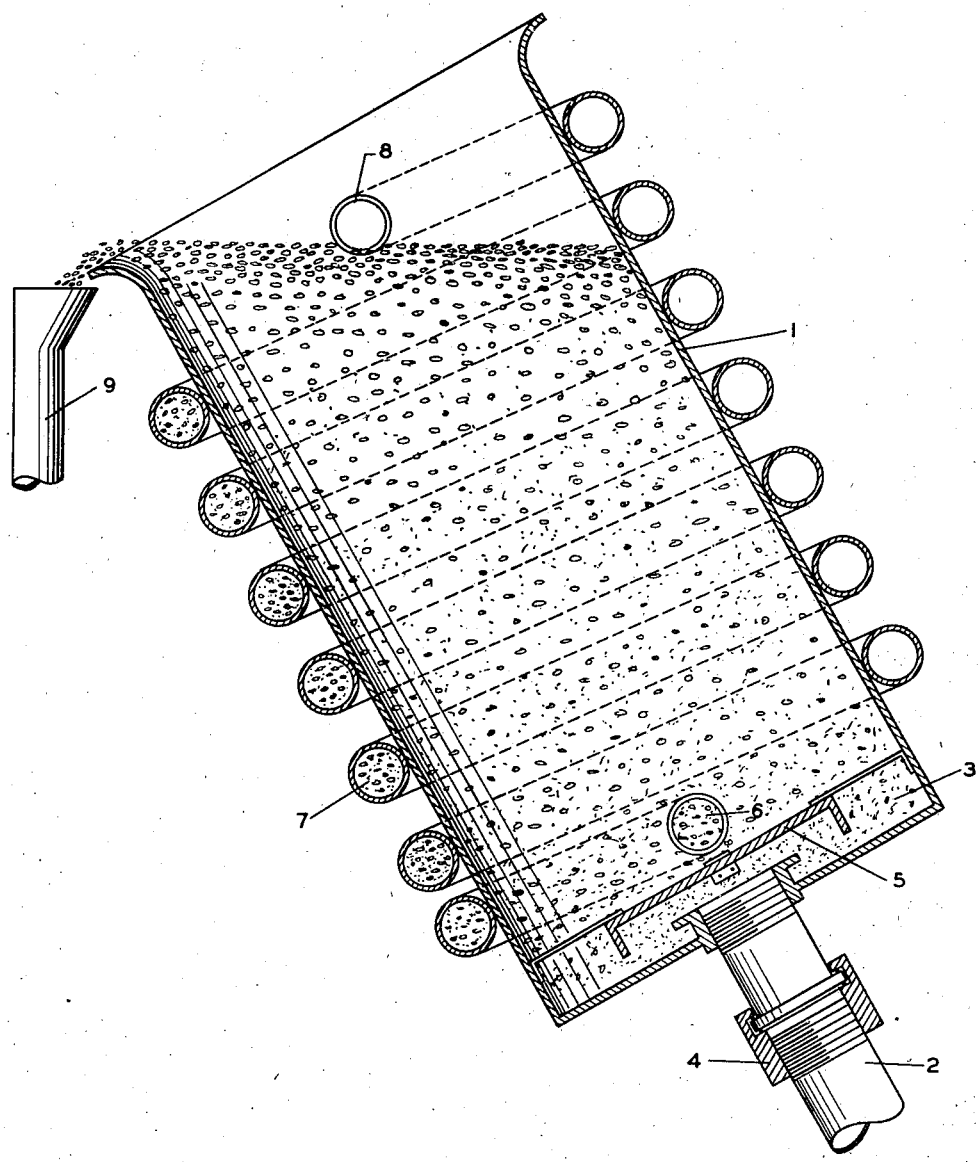
INVENTOR
S. C. CARNEY
BY
Hudson, Young & Yinger
ATTORNEY Patented Mar. 7, 1944

2,343,401

UNITED STATES PATENT OFFICE 2,343,401

SEPARATION APPARATUS

Samuel C. Carney, Bartlesville, Okla., assignor to Phillips Petroleum Company, a corporation of Delaware Original application June 26, 1939, Serial No. 281,294. Divided and this application May 28, 1942, Serial No. 444,897

4 Claims. (Cl. 259—3)

The present invention relates to an apparatus for separating carbon black or any other fine, dusty powder which is entrained as fine dust in a stream of gas or air, and is a division of my copending application, Serial No. 281,294, filed June 26, 1939, and now issued as Patent No. 2,293,113. Its purpose is similar to well known devices in the art such as bags, cyclone separators, Cottrell precipitators, etc.

In recent years most carbon black plants have been equipped with some process for increasing the density of the raw black by pelleting or granulating, as for example, by use of my pelleting process, copending application, Serial No. 259,065, filed February 28, 1939, and issued February 16, 1943, as U. S. Patent No. 2,311,145.

Black so prepared is known in the trade as "dustless." Though it is relatively dustless as compared with the original material, the pelleting plants themselves are to a layman far from dustless. It has occurred to operators of such plants that if a reduced pressure equal to one or two inches of water were maintained in the pelleting or granulating apparatus and its necessary sieves and conveyors, dust incident to the pelleting process could be prevented from escaping into the building. But even when exhaust fans for this purpose have been installed but little relief was obtained because of the well known inefficiency of bag filters in collecting the very fine carbon dust.

There are also known processes for producing carbon black from gas by decomposition which leaves the carbon entrained in the gas mixture concurrently produced. In these, cyclone, bag and Cottrell precipitators are used. The cyclone is very inefficient and the gases must be cooled to a low temperature when bags are used.

My process uses as a filter medium the so-called granulated or agglomerated carbon black such as is now being produced by many plants.

The advantages of the present process and apparatus over known processes and apparatus are simplicity, low cost and self cleaning. As compared with cyclone or bag separators, it more completely removes the carbon. As compared to the Cottrell precipitator, it is less effective but more suitable for small installations and for those cases, frequent with carbon black, where the high efficiency of the Cottrell process is not required.

The object of the present invention is to provide an apparatus in which to use agglomerated or pelleted carbon black as a filtering medium to remove the light flocculent carbon black from a stream of air.

It is further an object of the present invention to provide an apparatus in which to use agglomerated or pelleted carbon black as a filtering medium to remove carbon black from gases, both of which are produced concurrently in the decomposition process of making carbon black.

Other objects and advantages of the invention will be apparent during the course of the following description.

The figure shows an elevational view, partly in section, of apparatus combining the filtering process with a pelleting process.

The figure shows the invention with inclusion of the step of continuously reconditioning the carbon aggregates of the filter bed. It is adapted for the first means of recovery of carbon black entrained in a stream of gas as produced by a decomposition process, as distinguished from the known channel process. In effect, it combines the separation from the gas stream with a pelleting process. By this means, the low density black has its density brought up in the separating process.

The numeral 1 represents a cylindrical chamber having in practice a diameter on the order of six feet and is suitably inclined from the vertical position with reference to the angle of repose of carbon agglomerates. It is mounted on trunnions and arranged to rotate about its central axis. The pipe 2 carries gas containing entrained fine carbon black into the space 3 in the end of the chamber. The pipe 2 has a swivel joint 4 which allows the chamber 1 to rotate and the pipe 2 to remain stationary. The end of pipe 2 within the space 3 is so covered by cup 5 that carbon aggregates will not roll into pipe 2 from the chamber 1. The lower end of the Archimedes spiral tube 7 is represented at 6 and the tube 7 encircles the outside surface of the chamber 1 and the opening 6 communicates with the inside of the chamber 1. The upper end of the spiral tube 7 again communicates with the interior of chamber 1 at 8. Thus the extremely fine material entering the chamber 1 through the air stream passing through 2 from the decomposition process is caught on the surface of the carbon agglomerates with which the chamber 1 is initially filled. As opening 6 comes to the bottom position, agglomerates will flow into the Archimedes spiral and will cease flowing as opening 6 comes to the upper position. Only the lower part of each coil of the spiral thus contains agglomerates which are carried upward and discharged back into the top of the chamber 1 through opening 8. On the passage upward through the spiral, the fine dust collected in the bottom of the chamber 1 from the gas stream will be tightly agglomerated on the previously formed granules and when reintroduced at the top constitutes a fresh filter bed constantly fed downwardly. The mechanism of this agglomeration is the same as the Archimedes spiral described in my copending application Serial No. 274,003, filed May 16, 1939, which has matured into Patent No. 2,263,118.

Seed as described in this prior application may also be introduced at the top of the chamber 1 in amount sufficient to form a commercial range of sizes. As the content of cylinder 1 is thus being added to from the gas stream and the added seed, it will continuously overflow into downpipe 9, the overflow being the crude product which is removed from commercial finishing and classification in the known manner.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. Apparatus for separating from a stream of air or gas, carbon black entrained therein as dust and at the same time agglomerating said removed carbon black to granules of carbon black comprising a rotating chamber filled with granules of carbon black, an entrance into the chamber for the stream of air or gas containing the carbon black dust, an exit from the chamber for the clean air and a spiral conduit wrapped around the cylinder for imparting a gentle rolling motion to the carbon black granules to agglomerate the carbon black dust to the granules.

2. Apparatus for separating from a stream of air or gas, carbon black entrained therein as dust and at the same time agglomerating said removed carbon black to granules of carbon black comprising a rotating chamber filled with granules of carbon black, an entrance into the chamber for the stream of air or gas containing the carbon black dust, an exit from the chamber for the clean air and a spiral rubber conduit wrapped around the cylinder for imparting a gentle rolling motion to the carbon black granules to agglomerate the carbon black dust to the granules.

3. Apparatus for separating from a stream of air or gas carbon black entrained therein as a dust and at the same time agglomerating said removed carbon black to the granules of carbon black comprising a rotating cylinder filled with granules of carbon black, an entrance into the chamber for the stream of air or gas containing the carbon black dust, an exit from the chamber for the clean air, a spiral conduit wrapped around the cylinder and rotating therewith, said spiral conduit connecting into the bottom of the cylinder and lifting the granules to the top of the cylinder while agglomerating the carbon black dust to the granules.

4. Apparatus for separating from a stream of air or gas carbon black entrained therein as a dust and at the same time agglomerating said removed carbon black to the granules of carbon black comprising a rotating cylinder filled with granules of carbon black, an entrance into the chamber for the stream of air or gas containing the carbon black dust, an exit from the chamber for the clean air, a spiral conduit wrapped around the cylinder and rotating therewith, the spiral conduit connecting into the bottom of the cylinder and lifting the granules and at the same time, agglomerating the carbon black filtered out to the granules, and discharging the granules into the top of the cylinder for another passage therethrough as a filtering means.

SAMUEL C. CARNEY.